United States Patent [19]

Shimizu et al.

[11] Patent Number: 5,651,888
[45] Date of Patent: Jul. 29, 1997

[54] FILTRATION MEMBRANE CARTRIDGE

[75] Inventors: Kenji Shimizu; Hiroshi Ishida; Yutaka Yamada; Kiyoshi Izumi; Masashi Moro; Yuji Soeda, all of Osaka, Japan

[73] Assignee: Kubota Corporation, Osaka, Japan

[21] Appl. No.: 599,977

[22] Filed: Feb. 14, 1996

Related U.S. Application Data

[63] Continuation-in-part of Ser. No. 426,143, Apr. 19, 1995, abandoned, which is a continuation of Ser. No. 163,666, Dec. 7, 1993, abandoned.

[30] Foreign Application Priority Data

| Dec. 16, 1992 | [JP] | Japan | 4-334791 |
| Jan. 21, 1993 | [JP] | Japan | 5-008000 |
| Jul. 16, 1993 | [JP] | Japan | 5-176317 |
| Jul. 16, 1993 | [JP] | Japan | 5-176318 |

[51] Int. Cl.⁶ .................................................. B01D 39/16
[52] U.S. Cl. .............................. 210/321.64; 210/321.75; 210/321.84; 156/290
[58] Field of Search ................... 210/321.75, 321.84, 210/321.64, 231, 232, 486, 488, 346, 500.92; 96/291, 11; 156/308.4, 290, 295

[56] References Cited

U.S. PATENT DOCUMENTS

| 4,051,041 | 9/1977 | Riede | 210/321.75 |
| 4,197,206 | 4/1980 | Korn | 210/461 |
| 4,229,304 | 10/1980 | Fismer | 210/486 |
| 4,264,447 | 4/1981 | Nicolet | 210/500.2 |
| 4,302,270 | 11/1981 | Nicolet | 156/290 |
| 4,369,112 | 1/1983 | Vincent et al. | 210/433.2 |
| 4,500,426 | 2/1985 | Ishii et al. | 210/346 |
| 4,671,873 | 6/1987 | Keller | 210/232 |
| 4,749,483 | 6/1988 | Spet | 210/346 |
| 4,846,970 | 7/1989 | Bertelsen et al. | 210/232 |
| 4,869,821 | 9/1989 | Korin | 210/321.64 |
| 4,919,805 | 4/1990 | Johnson | 210/486 |
| 4,963,258 | 10/1990 | Yagishita | 210/487 |
| 5,068,195 | 11/1991 | Hawell et al. | 435/284 |
| 5,094,749 | 3/1992 | Seita et al. | 210/321.75 |
| 5,192,456 | 3/1993 | Ishida et al. | 210/791 |
| 5,232,589 | 8/1993 | Kopf | 210/321.75 |
| 5,275,725 | 1/1994 | Ishii et al. | 210/321.67 |

FOREIGN PATENT DOCUMENTS

| 0457676 | 11/1991 | European Pat. Off. . |
| 2478483 | 9/1981 | France . |
| 2303860 | 8/1973 | Germany . |
| 3726865 | 8/1987 | Germany . |
| 3728825 | 8/1987 | Germany . |

*Primary Examiner*—Cynthia L. Nessler
*Attorney, Agent, or Firm*—Barnes, Kisselle, Raisch, Choate, Whittemore & Hulbert, P.C.

[57] ABSTRACT

A pair of filtering membranes are solidly bonded to a membrane-supporting plate by fusibly bonding each of the filtering membranes to the resin membrane-supporting plate. A main fusible domain is formed along peripheral edges of each of the filtering membranes. In addition, a plurality of subordinate fusible domains are intermittently formed in plural locations on one side or on both sides of the main fusible domain. By virtue of the above structure, bonding strength is secured by the main fusible domain, and yet, bonding strength is reinforced by locally provided subordinate fusible domains. A channel is formed in the membrane-supporting plate so that permeated liquid can swiftly flow through the filtering system. In addition, a plurality of projections are formed on peripheral edges of a filtration membrane cartridge facing inner surface of each gutter formed inside of each slit plate by way of causing the respective projections to slidably come into contact with the inner surface of the gutter. This in turn effectively minimizes frictional force between the filtration membrane cartridge and the gutter to enable the operator to easily insert and remove the filtration membrane cartridge into and from the gutter of the slit plate.

3 Claims, 11 Drawing Sheets

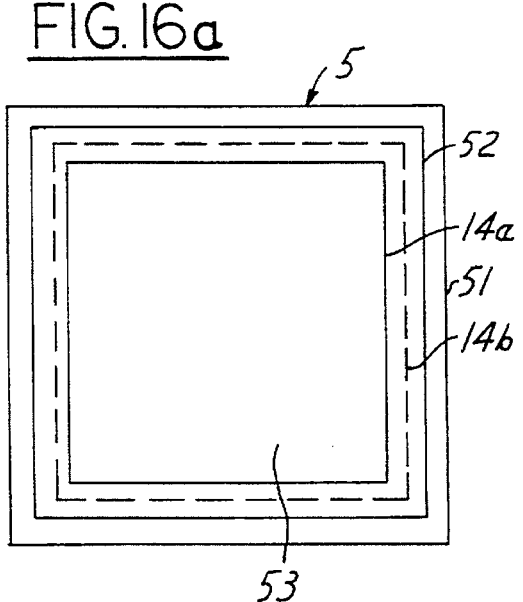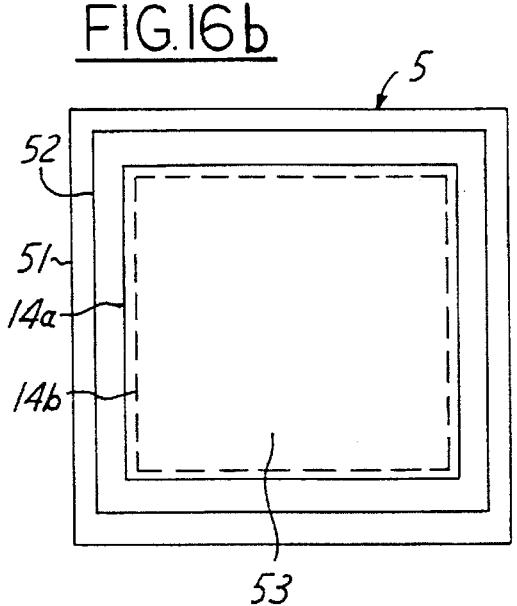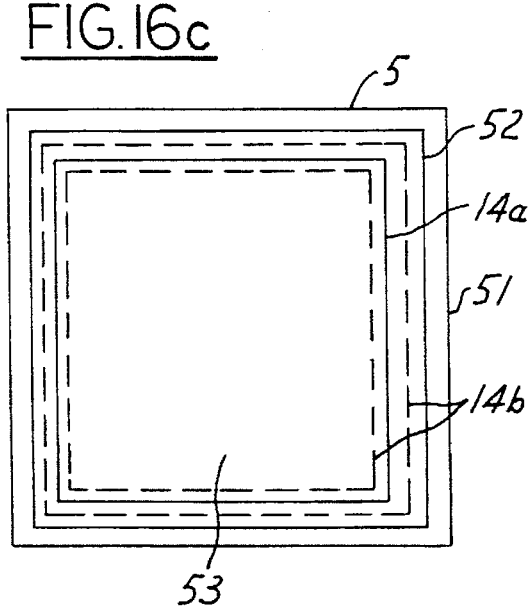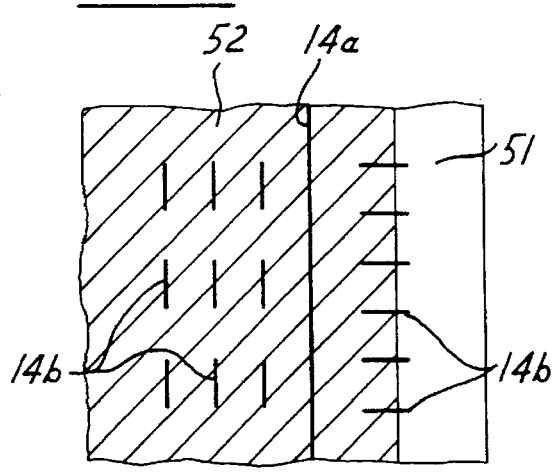

FILTRATION MEMBRANE CARTRIDGE

REFERENCE TO RELATED APPLICATION

This application is a continuation-in-part of application Ser. No. 08/426,143, filed Apr. 19, 1995, now abandoned which in turn was a continuation of Ser. No. 08/163,666, filed Dec. 7, 1993, now abandoned.

FIELD OF INVENTION

The present invention relates to a filtration membrane cartridge used for solid liquid separation. More particularly, the invention relates to a filtration membrane cartridge forming a most essential part of a membrane separation device.

BACKGROUND OF THE INVENTION

As shown in FIG. 1, a typical conventional membrane separation device is provided with a filtering membrane unit 3 which is disposed by way of being submerged in raw liquid pooled in a raw liquid processing tank. The conventional filtering membrane unit 3 incorporates a plurality of filtration membrane cartridges 5 inside of an upper casing 4 by vertically aligning them in parallel with each other at predetermined intervals. In addition, a gas supply unit 7 is disposed inside of a lower casing 6 in order to feed gas such as oxygen, air, or nitrogen gas, to raw liquid in accordance with specific uses. Each of the filtration membrane cartridges 5 stored in the filtering membrane unit 3 is internally provided with a permeated-liquid passage connected to a routed tube 9 of a suction tube 8 for sucking permeated liquid, where an end of the suction tube 8 is linked with a suction pump 10.

While operating the conventional membrane separation device 1, the suction pump 10 generates negative pressure against all the filtration membrane cartridges 5 stored in the filtering membrane unit 3 in order that permeated liquid can properly be sucked. On the other hand, gas such as oxygen or air (designated by arrowed mark A) is supplied to the gas supply unit 7 from an external source to enable the gas supply unit 7 to jet out a bubble flow into the space between adjoining filtration membrane cartridges 5 in the upward direction from the bottom of the filtering-membrane unit 3. The upward flow of bubbles generate an aerial lifting action to cause tangential flow along the membrane surface, said tangential flow sweeping away deposits on the membrane surface.

Conventionally, each filtration membrane cartridge 5 stored in the membrane separation device 1 is inserted in a gutter provided inside of each slit plate vertically set in the upper casing 4. However, since each filtration membrane cartridge 5 and the inner surface of each gutter remain in contact with each other over a substantial surface area, friction is generated between both surfaces, requiring the operator to carefully and smoothly move each of the cartridges 5 into and from the gutter.

Normally, any conventional filtration membrane cartridge 5 is based on the structure in which an organic filtering membrane is secured onto the surface of a plane rectangular membrane-supporting plate by bonding peripheral domains of the organic filtering membrane to the membrane-supporting plate. On the other hand, when securing the filtering membrane to the membrane-supporting plate with an adhesive agent, the adhesive strength is variable according to strength, durability, and chemical resistance properties of the selected adhesive agent, and therefore, the filtering membrane may incidentally be stripped off from the membrane-supporting plate.

DISCLOSURE OF THE INVENTION

Therefore, the object of the invention is to fully solve those problems described above by providing an improved filtration membrane cartridge that can readily be inserted into and removed from a filtering membrane unit and prevent filtering membranes from being stripped off from the membrane-supporting plates.

To achieve the above object, the improved filtration membrane cartridge according to the invention disposes each filtering membrane on both surfaces of a membrane-supporting plate made of resin and secures the edges of the filtering membranes to the membrane-supporting plate by way of fusing both of them or either of them by adhesion therebetween.

According to the above structure for embodying the invention, each of the accommodated filtering membranes can solidly be secured to the corresponding membrane-supporting plate by way of melting both the filtering membranes and the corresponding membrane-supporting plate or either of them via a thermal fusion or irradiation of ultrasonic waves.

To embody a better structure of the filtration membrane cartridge according to the invention, each filtering membrane is bonded to the corresponding membrane-supporting plate via a fusing process applied onto the main fusible domain which is peripherally and linearly formed along the periphery of the filtering membrane and subordinate fusible domains which are intermittently formed in plural locations along one side or both sides of the main fusible domains.

According to the above-referred to structure for embodying the invention, substantial bonding strength between the filtering membrane and the corresponding membrane-supporting plate is secured by the main fusible domain. Furthermore, bonding strength is reinforced by the effect of local fusion applied onto plural subordinate fusible domains.

According to the above-referred to better structure of the filtration membrane cartridge for embodying the invention, the membrane supporting plate has a channel for permeated liquid which is open to the surface of the membrane-supporting plate that faces the corresponding filtering membrane.

According to the above-referred structure for embodying the invention, even when the filtering membrane is closely pressed against the corresponding membrane-supporting plate by the effect of negative pressure caused by the liquid sucking operation, permeated liquid can securely flow through a plurality of channels which are constantly open to the surface of the membrane-supporting plate to enable permeated liquid to swiftly flow through the filtration system.

According to the above-referred to better structure of the filtration membrane cartridge for embodying the invention, a pair of spacers are inserted between the filtering membranes and the corresponding membrane-supporting plate.

According to the above-referred to structure for embodying the invention, in resistance against negative pressure, each spacer supports the corresponding filtering membrane by providing a predetermined space on the corresponding membrane-supporting plate to enable liquid filtered out of the filtering membrane to swiftly flow through the predetermined space.

To achieve the above objects, the invention provides an improved filtration-membrane cartridge. Each of a predetermined number of the inventive filtration-membrane cartridges is inserted in the corresponding gutter of a slit plate provided inside of the filtering-membrane unit. In particular, the invention provides a plurality of projections on peripheral edge (being opposite from the inner surface of the gutter of the slit plate) of the filtration membrane cartridge to enable these projections to slide themselves and to come into contact with the inner surface of the gutter provided in the slit plate.

According to the above-referred to structure for embodying the invention, whenever inserting the filtration membrane cartridge into the corresponding gutter and removing it therefrom, the filtration membrane cartridge is slidably brought into contact with the inner surface of the corresponding gutter of the slit plate by effect of plural projections set to peripheral edges of the filtration membrane cartridge. This in turn reduces the contact area of the cartridge against the gutter to reduce frictional force to permit the operator to easily insert and remove the filtration membrane cartridge into and from the filtering membrane unit.

BRIEF DESCRIPTION OF THE DRAWINGS

FIGS. 16a, 16b and 16c are schematic patterns designating structures of fused domains in the filtration membrane cartridge according to the invention;

FIG. 17 is a schematic pattern designating another structure of the fused domains in the filtration membrane cartridge according to the invention;

DESCRIPTION OF THE PREFERRED EMBODIMENTS

Figure 1:
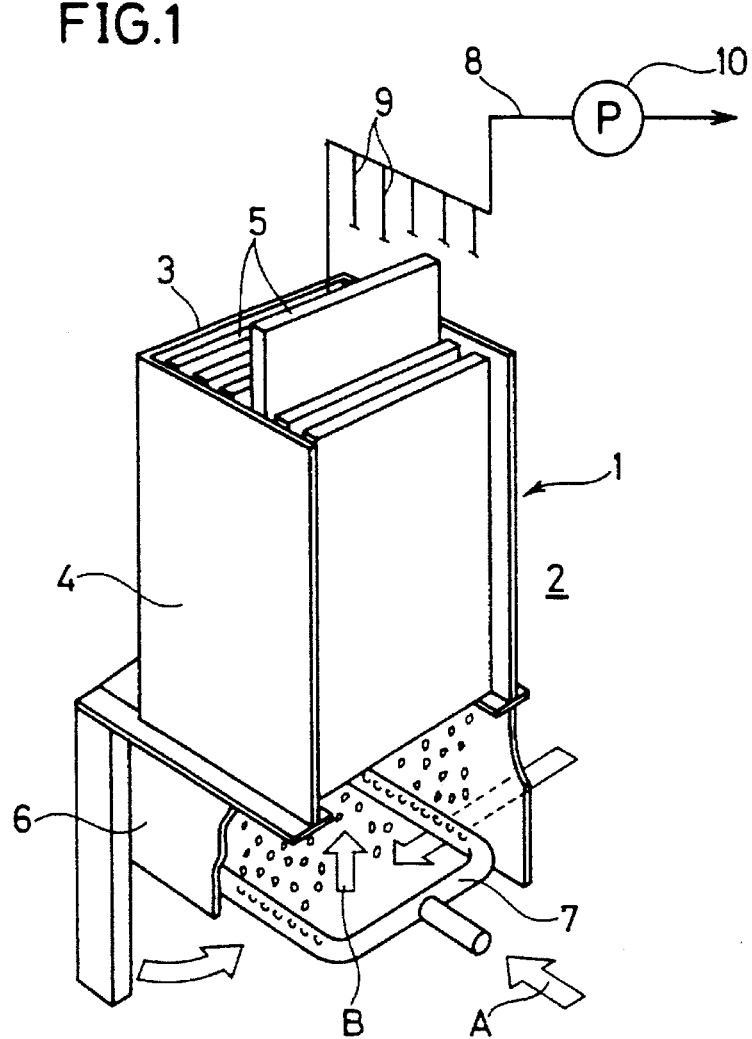
FIG. 1 is an overall perspective view of the filtration membrane cartridge according to an embodiment of the invention.
Figure 2:
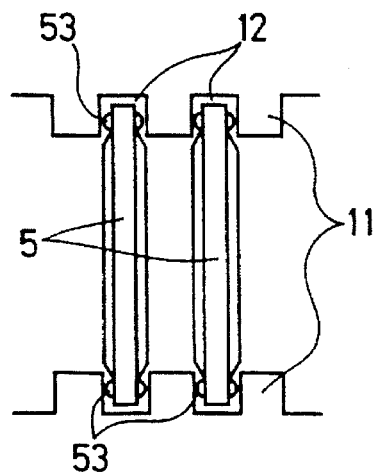
FIG. 2 is a plan View designating a structure for retaining the filtration membrane cartridge in position according to an embodiment of the invention.
Figure 3:
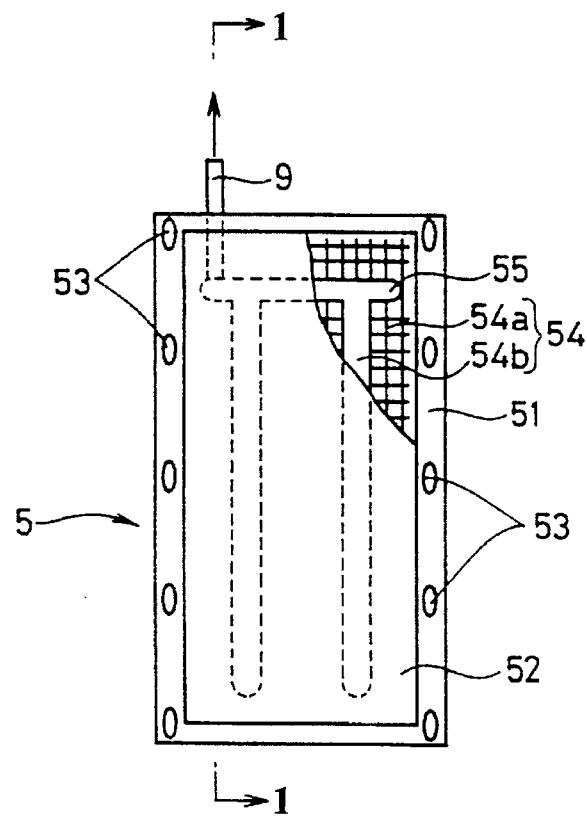
FIG. 3 is a front view of the filtration membrane cartridge according to an embodiment shown in in FIG. 2.
Figure 4:
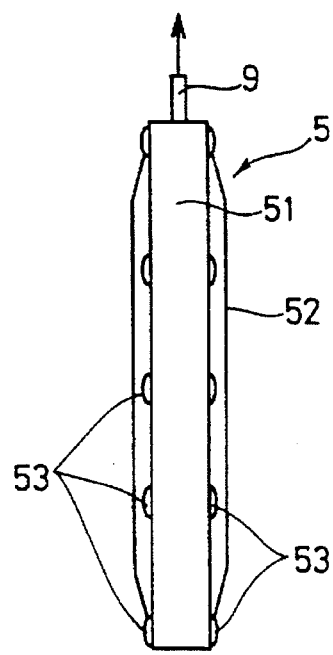
FIG. 4 is a lateral view of the filtration membrane cartridge according to an embodiment shown in FIG. 2.
Figure 5:
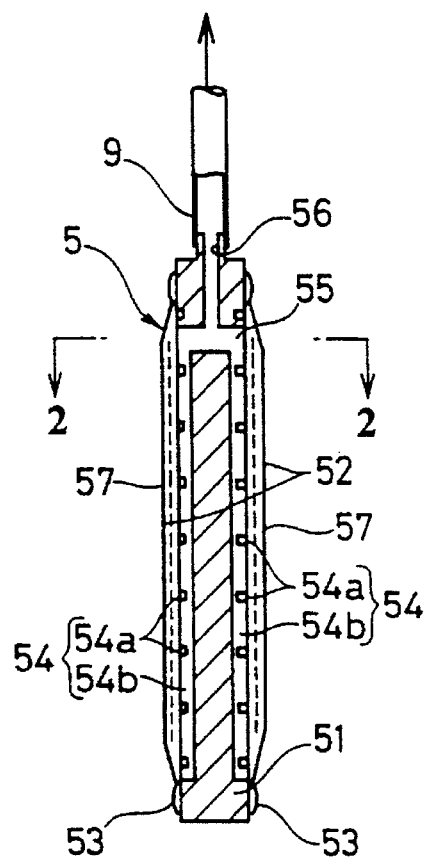
FIG. 5 is a cross-sectional view of the filtration membrane cartridge across arrowed line 1—1 shown in FIG. 3.
Figure 6:
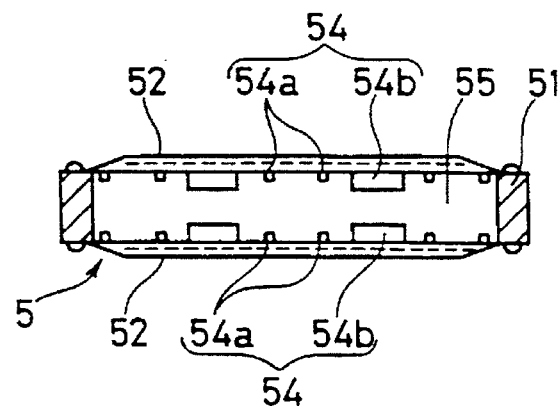
FIG. 6 is a cross-sectional view of the filtration membrane cartridge across arrowed line 2—2 shown in FIG. 5.

Referring now to the accompanying drawings, full details of the improved filtration membrane cartridge according to an embodiment of the invention are described below. Those essential components which function the same as corresponding components shown in FIG. 1 are designated by the same reference numerals, and thus, description of these is omitted.

Referring now to FIGS. 2 through 9, a plurality of filtration membrane cartridges 5 are retained by a plurality of corresponding slit plates 11 which are accommodated in an upper casing 4 of a filtration membrane assembly unit 3. More particularly, as shown in FIG. 1, a plurality of gutters 12 are formed in each slit plate 11 at predetermined intervals. A plurality of filtration membrane cartridges 5 are vertically inserted in the corresponding gutters 12 in parallel with each other.

Each of the filtration membrane cartridges 5 has a novel structure comprising a pair of filtering membranes 52 each consisting of an organic membrane such as an ultrafiltration membrane or microfiltration membrane, which are disposed on both surfaces of the plane rectangular membrane-supporting plate 51 made from resin such as PVC for example. A pair of filtering membranes 52 are peripherally secured to the corresponding membrane-supporting plate 51 by applying a fusing process.

Figure 10:
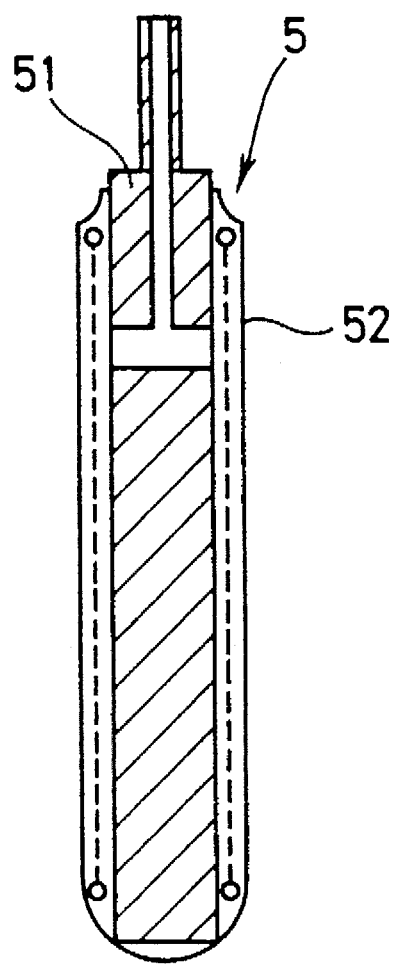
FIG. 10 is a cross-sectional view designating another example of the disposition of the filtering membrane against the corresponding membrane-supporting plate.
Figures 11, 12:
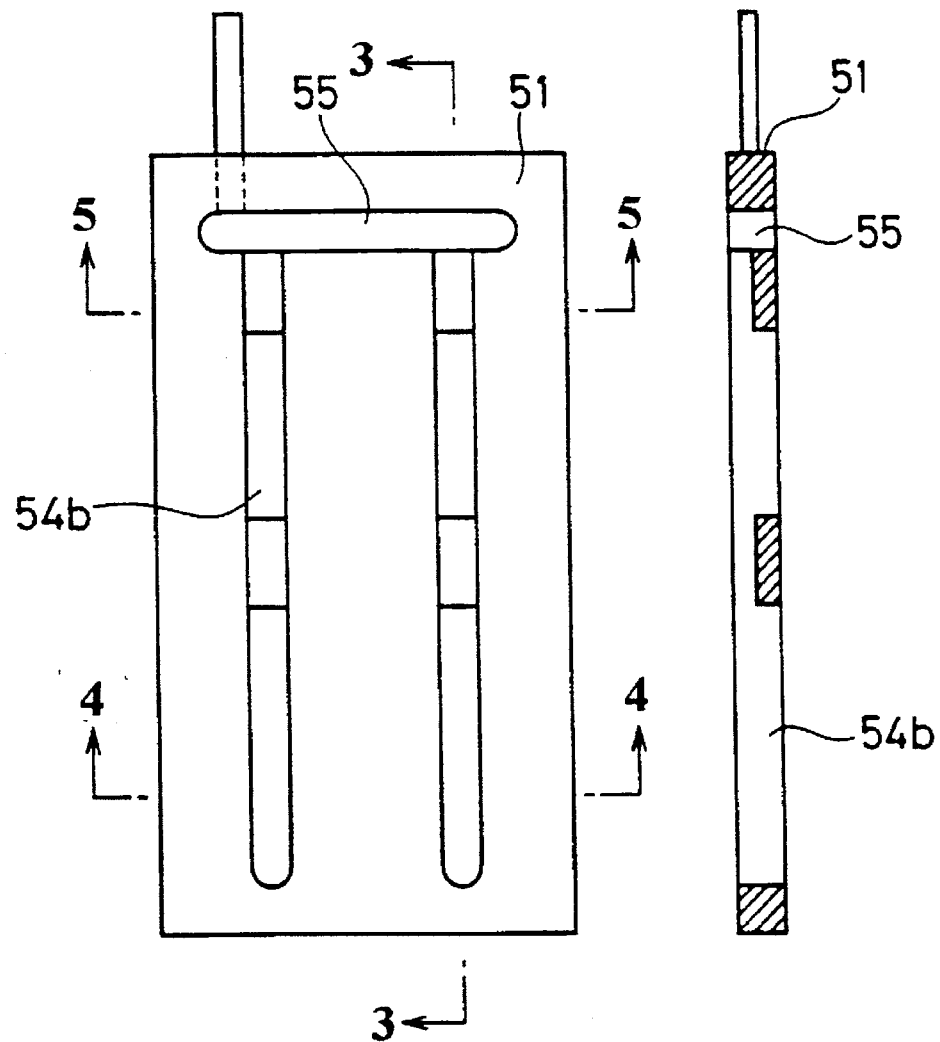
FIG. 11 is a front view designating another structure of grooves formed in the membrane-supporting plate.
FIG. 12 is a cross-sectional view of the membrane-supporting plate across arrowed line 3—3 shown in FIG. 11.
Figure 13:
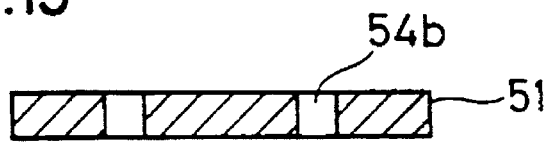
FIG. 13 is a cross sectional view of the membrane-supporting plate across arrowed line 4—4 shown in FIG. 11.
Figure 14:
FIG. 14 is a cross-sectional view of the membrane-supporting plate across arrowed line 5—5 shown in FIG. 11.

Although the present embodiment has disposed the filtering membranes 52 on both surfaces of the corresponding membrane-supporting plate 51, alternatively, as shown in FIG. 10, a single sack-like filtering membrane 52 may also be disposed by way of fully covering the membrane-supporting plate 51. The novel method of bonding the filtering membranes 52 to the corresponding membrane-supporting plate 51 will be described later on.

A channel for permeated liquid further inside of the filtering membranes 52 is linked with a branch tube 9 routed from a suction tube 8 for sucking permeated liquid at one side of the membrane-supporting plate 51 in the filtration membrane cartridge 5. Raw liquid is filtered by these filtration membrane cartridges 5 by the effect of negative pressure generated by a suction pump 10 via a liquid suction tube 8.

A plurality of projections 53 are disposed on the peripheral edges of the membrane-supporting plate 51 at predetermined intervals, more particularly, on a pair of parallel sides opposite from a respective gutter 12 of respective slit plates 11. Those plural filtration membrane cartridges 5 are secured to the filtering-membrane unit 3 by slidably bringing those projections 53 into contact with the inner surfaces of the corresponding gutter 12.

Each of these projections 53 is elliptically shaped in the vertical direction of the filtration membrane cartridge 5. For example, in order to manufacture the filtration membrane cartridges 5 having 1000 mm of length and 500 mm of width, the filtration membrane cartridge 5 is essentially provided with a number of projections 53 each being 5 mm in major diameter, 1 to 2 mm in minor diameter, and 0.5 mm in height, by a certain number ranging from 6 to 20 units per surface of the filtration membrane cartridge 5.

Since those projections 53 and the inner surface of the gutter 12 come into contact with each other via confined contactable area to cause minimal friction to occur, the operator can readily insert and take out each filtration membrane cartridge 5 into and from the corresponding gutter 12 of the slit plate 11.

Even though distortion ever occurs in the filtration membrane cartridge 5 or in the slit plate 11, or if the filtration membrane cartridge 5 could not easily be inserted or drawn out as a result of inadequate width of the corresponding gutter 12 provided in the slit plate 11, the filtration membrane cartridge 5 can properly fit in with the gutter 12 merely by scraping off those projections 53.

The membrane-supporting plate 51 of the filtration membrane cartridge 5 incorporates a channel 54 for permeated liquid flowing out of the filtering membranes 52. The channel 54 comprises fine meshy grooves 54a or a plurality of slits 54b or grooves 54a and slits 54b by way of combining them. To implement the present embodiment, the fine meshy grooves 54a are combined with the slits 54b for example. This method is described below.

Figure 7:
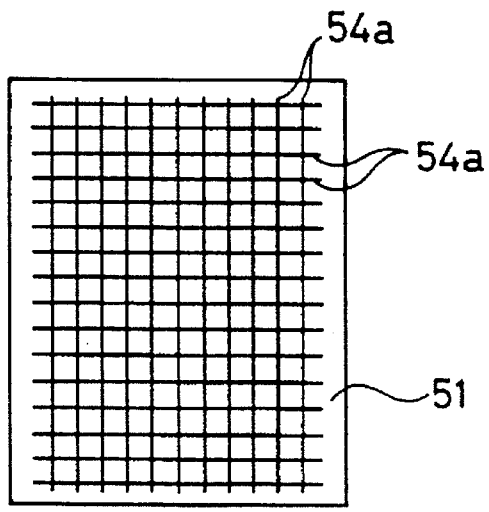
FIG. 7 is a schematic pattern of the groove formed in the membrane-supporting plate according to an embodiment of the invention.
Figure 8:
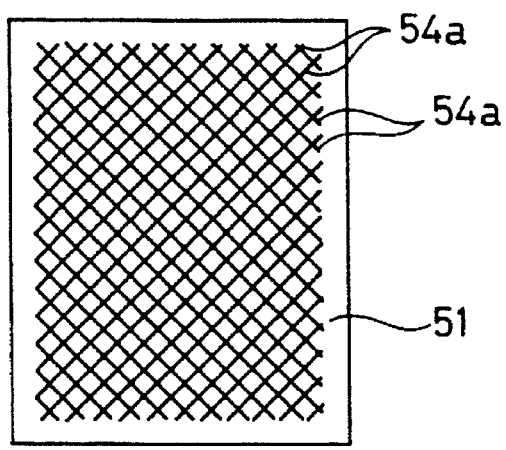
FIG. 8 is another schematic pattern of the groove formed in the membrane-supporting plate according to another embodiment of the invention.
Figure 9:
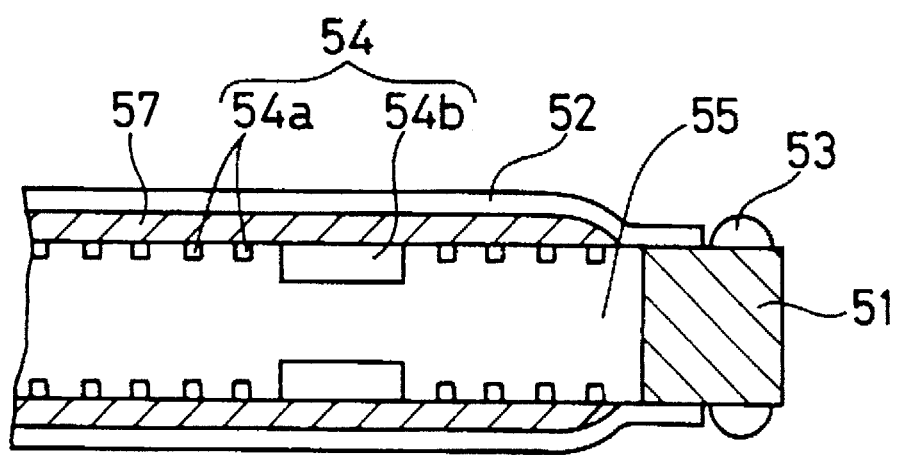
FIG. 9 is a partially enlarged cross-sectional view of the filtration membrane cartridge according to the invention.

The fine meshy grooves 54a are formed on both-side surfaces of the membrane-supporting plate 51. Structurally, a plurality of fine linear grooves 54a are linked with each other in mesh form. These grooves 54a are formed by applying an etching process against a metal mold used for molding the membrane-supporting plate 51. These fine linear grooves 54a are linked with peripheral edges of apertures of the slits 54b. As shown in FIGS. 7 and 8, these fine linear grooves 54a may be disposed in parallel relation or at an oblique angle against the horizontal and vertical Bides of the rectangular membrane-supporting plate 51. Although the present embodiment uses the fine meshy grooves 54a, when being combined with the slits 54b, these fine meshy grooves 54a may be arranged in a striped pattern. Each of these fine meshy grooves 54a has less than 1 mm of depth, less than 1 mm of width, and less than 5 mm of intervals between adjoining grooves 54a. On the other hand, those slits 54b each having an appropriate depth are respectively open to the surface of the membrane-supporting plate 51 and disposed in parallel with vertical sides of the membrane-supporting plate 51. As shown in FIGS. 11 through 14, those slits 54b may be formed by way of extending themselves in the direction of the thickness of the membrane-supporting plate 51. A sump of permeated liquid 55 is formed at a location close to an end and along the widthwise direction of the membrane-supporting plate 51. The sump 55 is linked with the fine meshy grooves 54a and the slits 54b at peripheral edges of apertures on the surface of the membrane-supporting plate 51. A suction portion 56 is formed at the upper end of the membrane-supporting plate 51 so that it can be linked with the sump 55. The branch tube 9 routed from the suction tube 8 is connected to the suction port 56.

When activating the suction pump 10 to apply negative pressure to the filtration membrane cartridge 5 via the suction tube 8, permeated liquid is sucked into the filtration membrane cartridge 5, and then permeated liquid out of the filtering membranes 52 flows into the sump 55 via those fine meshy grooves 54a and those slits 54b formed inside of the membrane supporting plate 51 to flow into the branch tube 9 of the suction tube 8 from the suction port 56.

While the above processes are underway, even though the filtering membranes 52 closely adhere to the membrane-supporting plate 51 by effect of negative pressure, since flow of permeated liquid on the surface of the membrane-supporting plate 51 can be secured by means of the fine meshy grooves 54a and the slits 54b, permeated liquid can easily flow through the space between the filtering membranes 52 and the membrane-supporting plate 51. Especially, when slits 54b are formed, the instance of the flow of metered liquid in the fine meshy grooves 54a shortens, facilitating smoother flow of the liquid.

A pair of spacers 57 are provided between the membrane-supporting plate 51 and the filtering membranes 52. Each of these spacers 57 provides a predetermined interspace between the membrane-supporting plate 51 and the filtering membranes 52 to facilitate permeated liquid to smoothly flow therethrough. Each of these spacers 57 is composed of a felt-like sheet or plastic net or a metallic net. Each of the filtering membranes 52 has a configuration greater than that of the spacer 57 by enough to fully cover the spacer 57, and therefore, these spaces 57 are prevented from coming into direct contact with the raw liquid.

According to the structure described above, since the spacers 57 respectively support the filtering membranes 52 by way of resisting negative pressure caused by permeated liquid suction operation by means of predetermined space formed on the membrane-supporting plate 51, and therefore, permeated liquid out of the filtering membranes 52 can swiftly flow through the predetermined space. When implementing the present embodiment, the spacers 57 are provided in conjunction with permeated liquid channels 54. However, it is also practicable for the embodiment to solely provide these spacers 57 and to omit the permeated liquid channels 54.

Figure 15:
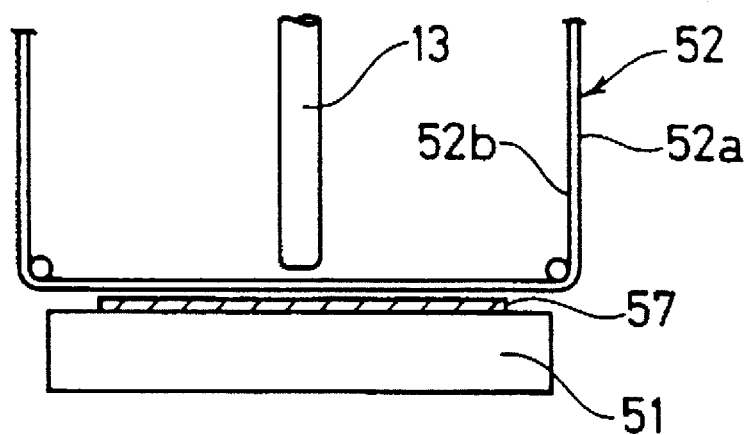
FIG. 15 illustrates a method of bonding a filtering membrane to the corresponding membrane-supporting plate.

Next, the method of fusibly bonding the filtering membranes 52 to the membrane-supporting plate 51 is described below. As shown in FIG. 15, the membrane-supporting plate 51, the filtering membranes 52, and the spacers 57, are superposed in sequence. In the present embodiment, each of the filtering membranes 52 comprises a thermoplastic nonwoven cloth 52a made from saturated polyester resin functioning as the supporting body and a membrane as a surface layer 52b integrated with each other. However, the filtering membrane 52 may be of the one devoid of the non-woven cloth 52a. Those spacers 57 are not always essential for embodying the filtration membrane cartridge related to the invention.

After superposing those components mentioned above, a horn 13 is set to a predetermined position above the filtering membranes 52 in order to oscillate ultrasonic waves. Either a rotary horn 13 or a stationary horn 13 is usable, where the rotary horn 13 is specifically used when processing compactly composed filtering membranes 52. On the way of moving over the filtering membranes 52, the horn 13 oscillates ultrasonic waves to fusibly bond the filtering membranes 52 to the membrane-supporting plate 51.

As mentioned above, since the non-woven cloth 52a functioning as the substrate for supporting the filtering membranes 52 is made from saturated polyester resin, the nonwoven cloth 52a is subject to melting at a temperature above 140° C. for example. On the other hand, the membrane-supporting plate 51 is subject to melting at a temperature lower than the melting point of the non-woven cloth 52a in that the membrane-supporting plate 51 is made from ABS resin or the like. Therefore, when applying aperture lower than about 140° C., the membrane-supporting plate is melted to cause the molten resinous component to infiltrate into the non-woven cloth 52a, thus causing the filtering membranes 52 to be bonded to the membrane-supporting plate 5.

On exposure to temperature higher than about 140° C., both the membrane-supporting plate 51 and the non-woven cloth 52a are subject to fusion with each other.

Even when thermally treating the filtering membranes 52 devoid of the non-woven cloth 52a, the filtering membranes 52 can securely be fused with the membrane-supporting plate 51 by means of the molten resinous component of the membrane-supporting plate 51 or by effect of the simultaneous fusion of the resinous component of the membrane-supporting plate 51 and the filtering membranes 52.

On the way of executing the thermal fusion process by applying ultrasonic waves, the objective resinous component is apt to melt from the inner domain, and thus, it is desired that the horn 13 be activated via a thermally resistant tape disposed on the filtering membranes 52. Instead of the above fusing method using ultrasonic wave, local thermal treatment can also be performed for locally fusing the filtering membranes 52 with the membrane-supporting plate 51.

As described above, the filtering membranes 52 can solidly be bonded to the membrane-supporting plate 51 by causing the plastic membrane-supporting plate 51 and the filtering membranes 52 incorporating plastic substrate or either of these to be fused with each other via a thermal treatment or irradiation of ultrasonic waves.

As shown in FIGS. 16a–16c and FIG. 17, the membrane-supporting plate 51 and the filtering membranes 52 are fused with each other via the main fusible domain 14a peripherally and linearly provided along peripheral edges of the filtering membranes and the subordinate fusible domains 14b intermittently provided on a single side or on both sides of the main fusible domain 14a.

Figure 18:
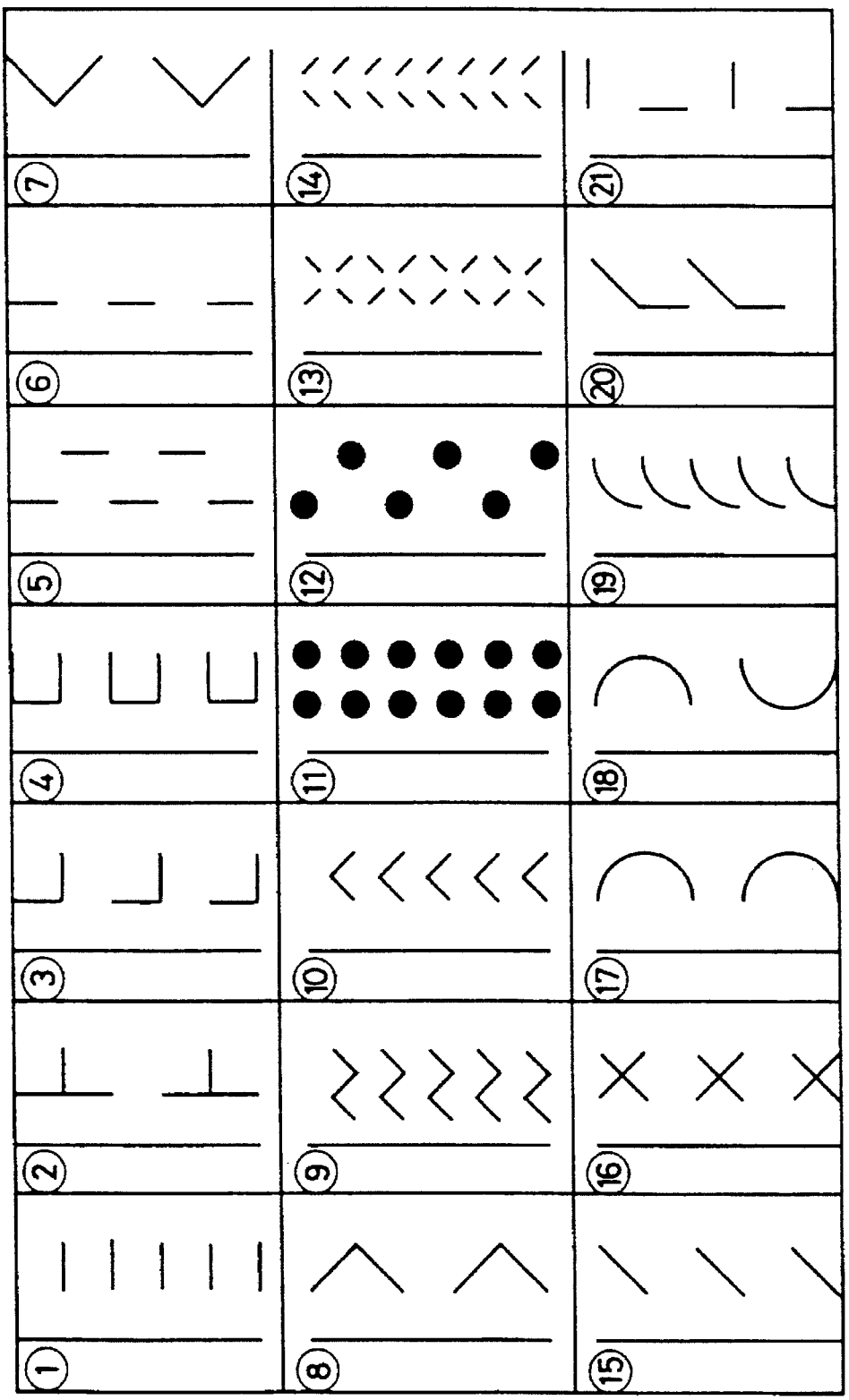
FIG. 18 is a schematic pattern designating another structure of the fuse domains in the filtration membrane cartridge according to the invention.

The main fusible domain 14a is provided in order to secure water-sealing effect and fundamental bonding strength. On the other hand, the subordinate fusible domains 14b are intermittently provided in plural positions in order to prevent the filtering membranes 52 from being wrinkled, and yet, the subordinate fusible domains 14b respectively reinforce the bonding strength between the membrane-supporting plate 51 and the filtering membranes 52. Considering economy of thermal energy and better effect of fusion, it is desired that the main fusible domain 14a be formed with narrow width. By providing the subordinate fusible domains 14b on the outer side only of the main fusible domain 14a (FIG. 16a), the unfused portion of the filtering membranes 52 is protected so that the filtering membranes 52 can fully be prevented from being stripped off from the membrane-supporting plate 51. Nevertheless, in the event that there is no fear of causing the filtering membranes 52 to be stripped off along the peripheral edges, it is possible for the embodiment to confine provision of the subordinate fusible domains 14b solely to the central part of the filtering membranes 52 (FIG. 16b). As shown in FIG. 18, not only the intermittent and linear formation, but the subordinate fusible domains 14b may also be provided in a variety of patterns such as the one being disposed a predetermined intervals for example.

FIG. 16a–FIG. 16c each show the main fusible domain 14a as a peripheral, continuous, narrow, rectangular border line adjacent to but spaced from the peripheral edges of the membrane 52, which completely encloses the central area therewithin.

In FIG. 16a, the subordinate fusible domains 14b are in the form of a peripheral, intermittent, non-continuous or broken line extending along and closely adjacent to the main fusible domain 14a but between the main fusible domain 14a and the peripheral edges of the membrane 52. The area 53 within the main fusible domain 14a is completely free of the main and subordinate fusible domains.

In FIG. 16b, the subordinate fusible domains 14b are in the form of a peripheral, intermittent, non-continuous or broken line extending along and closely adjacent to the main fusible domain 14a, but inside the main fusible domain 14a, that is, along the side of the main fusible domain 14a away from the peripheral edges of the membrane 52. The area 53 within the main fusible domain 14a and subordinate fusible domains 14b is completely free of the main and subordinate fusible domains.

In FIG. 16c, the subordinate fusible domains 14b are in two lines, one of which is a peripheral, intermittent, non-continous or broken line extending along and closely adjacent to the main fusible domain 14a between the main fusible domain 14a and the peripheral edges of the membrane 52, and the other of which is a peripheral, non-continuous or broken line extending along and closely adjacent to the main fusible domain 14a but inside the main fusible domain 14a, that is, along the side of the main fusible domain 14a away from the peripheral edges of the membrane 52. The area 53 within the main fusible domain 14a and the subordinate fusible domains 14b is completely free of the main and subordinate fusible domains.

In each of the illustrations of FIGS. 16a, 16b and 16c, the membrane is peripherally fused to the membrane-supporting plate by a main fusible domain and a plurality of subordinate fusible domains defining a sealed border enclosing an effective filtration area 53 free of the main and subordinate fusible domains. Thus, the entire filtration area within the sealed border is capable of maximum filtration capability without interference from the main and subordinate fusible domains.

The subordinate fusible domains not only more securely bond the membrane to the supporting plate without the risk of stripping, but also prevent wrinkling of the membrane which might otherwise result from the fusion bonding by the main fusible domain.

Figure 19:
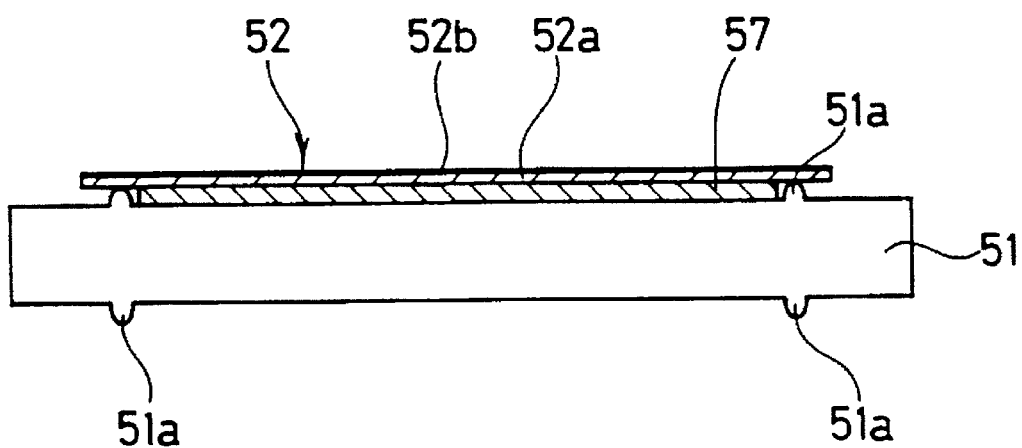
FIG. 19 illustrates another method of bonding a filtering membrane to the corresponding membrane-supporting plate.

As shown in FIG. 19 for example, prior to the execution of a fusion process between the membrane-supporting plate 51 and the filtering membrane 52, a plurality of projected fusible domains 51a may integrally be formed on the membrane-supporting plate 51. When implementing this method, initially, each of the filtering membranes 52 is disposed by way of fully concealing the projected fusible domains 51a, and then, the fusible domains 51 are melted via a thermal treatment or irradiation of ultrasonic waves before executing a compressible fusing process to fuse the membrane-supporting plate 51 with the filtering membranes 52 at locally melted regions.

As a result of the provision of the above structure, the filtering membranes 52 can securely be bonded to the membrane-supporting plate 51 by way of preventing the main component of the membrane-supporting plate 51 from being melted, and yet, by way of preventing deformation in the periphery of melted regions and subsequent deformation of the filtering membranes 52 from occurrence. The above projected fusible domains 51a may also be formed using members having any shape other than that of the membrane-supporting plate 51, like bar-shaped member for example.

What is claimed is:

1. A plurality of filtration membrane cartridges submerged for use in a raw liquid processing tank, each of said cartridges comprising:

a fusible resin membrane-supporting plate, a filtration membrane disposed on the surface of the resin membrane-supporting plate, the membrane-supporting plate having a plurality of interconnecting linear gutters and channels for permeated liquid formed on the surface of the membrane-supporting plate facing the filtration membrane;

the filtration membrane comprising a nonwoven fabric support member on the side thereof abutting on the membrane-supporting plate, the surface of said support member being impregnated with a membrane to form the filtration membrane; and said filtering membrane being peripherally fused to said membrane-supporting plate by a main fusible domain and a plurality of subordinate fusible domains defining a sealed border enclosing an effective filtration area free of said main and subordinate fusible domains, said main fusible domain being formed peripherally in a continuous line adjacent to but spaced from the peripheral edges of the filtering membrane, said plurality of subordinate fusible domains being formed intermittently in a non-continuous line extending along and disposed closely adjacent to the main fusible domain, the resin of the resin-membrane-supporting plate and the nonwoven fabric of the filtration membrane being fused together so that the filtration membrane is bonded to the membrane supporting plate, said line of subordinate fusible domains being formed between said main fusible domain and the peripheral edges of the filtering membrane.

2. A plurality of filtration membrane cartridges submerged for use in a raw liquid processing tank, each of said cartridges comprising:

a fusible resin membrane-supporting plate, a filtration membrane disposed on the surface of the resin membrane-supporting plate, the membrane-supporting plate having a plurality of interconnecting linear gutters and channels for permeated liquid formed on the surface of the membrane-supporting plate facing the filtration membrane;

the filtration membrane comprising a nonwoven fabric support member on the side thereof abutting on the membrane-supporting plate, the surface of said support member being impregnated with a membrane to form the filtration membrane; and said filtering membrane being peripherally fused to said membrane-supporting plate by a main fusible domain and a plurality of subordinate fusible domains defining a sealed border enclosing an effective filtration area free of said main and subordinate fusible domains, said main fusible domain being formed peripherally in a continuous line adjacent to but spaced from the peripheral edges of the filtering membrane, said plurality of subordinate fusible domains being formed intermittently in a non-continuous line extending along and disposed closely adjacent to the main fusible domain, the resin of the resin-membrane-supporting plate and the nonwoven fabric of the filtration membrane being fused together so that the filtration membrane is bonded to the membrane supporting plate, said line of subordinate fusible domains being formed along the side of said main fusible domain away from the peripheral edges of the filtering membrane.

3. The cartridges set forth in claim 2, wherein said subordinate fusible domains are also formed intermittently in a second non-continuous line between said main fusible domain and the peripheral edges of the filtering membrane.

* * * * *